(12) United States Patent
Konagai et al.

(10) Patent No.: US 8,829,103 B2
(45) Date of Patent: Sep. 9, 2014

(54) CARBON FIBER COMPOSITE MATERIAL

(75) Inventors: Yuhei Konagai, Shizuoka (JP); Yutaka Kondo, Shizuoka (JP); Naoaki Sonoda, Shizuoka (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/617,244

(22) Filed: Sep. 14, 2012

(65) Prior Publication Data

US 2014/0080960 A1    Mar. 20, 2014

(51) Int. Cl.
*C08L 101/00*    (2006.01)
*C08K 3/04*    (2006.01)

(52) U.S. Cl.
USPC .......... 524/495; 524/590; 524/567; 428/35.7; 428/74; 428/368; 428/372

(58) Field of Classification Search
USPC .......... 524/495, 590, 567; 428/35.7, 74, 368, 428/372
See application file for complete search history.

(56) References Cited

U.S. PATENT DOCUMENTS

| | | | |
|---|---|---|---|
| 5,108,678 A | 4/1992 | Hirasaka et al. | |
| 5,194,462 A | 3/1993 | Hirasaka et al. | |
| 2011/0143110 A1 | 6/2011 | Tsuchiya et al. | |
| 2012/0012263 A1 | 1/2012 | Tsuchiya et al. | |
| 2013/0317161 A1* | 11/2013 | Konagai et al. ............... | 524/495 |

FOREIGN PATENT DOCUMENTS

| | | |
|---|---|---|
| JP | S57-117661 A | 7/1982 |
| JP | 03-047740 A | 2/1991 |
| JP | H04-115907 A | 4/1992 |
| JP | H04-163109 A | 6/1992 |
| JP | 2002-212311 A | 7/2002 |
| JP | 2004-043985 A | 2/2004 |
| JP | 2010-037358 A | 2/2010 |

OTHER PUBLICATIONS

Office Action issued Nov. 12, 2013 in counterpart Japanese Application No. 2010-044286.
Japanese Office Action issued on Jun. 10, 2014 in corresponding Japanese Appln. No. 2010-044286.
Notification of Information Offer in corresponding Japanese patent application JP 2010-044286, dispatched on Jul. 8, 2014.

* cited by examiner

*Primary Examiner* — Robert D. Harlan
(74) *Attorney, Agent, or Firm* — Banner & Witcoff, Ltd.

(57) ABSTRACT

A composite material includes: carbon fibers having an average fiber length of more than about 10 mm and about 100 mm or less; and a thermoplastic resin. The carbon fibers are substantially two-dimensionally-randomly oriented. The composite material includes a carbon fiber bundle (A) in a ratio of more than 0 volume % and less than about 30 volume % to a total volume of the carbon fibers, the carbon fiber bundle (A) including the carbon fibers of a critical single fiber number defined by formula (1) or more. An average number (N) of the carbon fibers in the carbon fiber bundle (A) satisfies formula (2).

Critical single fiber number=$600/D$      (1)

$1.0 \times 10^4/D^2 < N < 2.5 \times 10^4/D^2$      (2)

D is an average fiber diameter (μm) of the carbon fibers.

10 Claims, 3 Drawing Sheets

CARBON FIBER COMPOSITE MATERIAL

BACKGROUND

1. Technical Field

The present invention relates to a fiber reinforced composite material which includes a thermoplastic resin as a matrix, and more particularly, a carbon fiber composite material which has high physical property, which can be made thinner, and which is excellent in surface quality.

2. Background Art

As a fiber-reinforced composite material using a carbon fiber, an aramid fiber, a glass fiber, or the like as a reinforcement fiber, an isotropic random mat is used from standpoints of formativeness and process simplicity. This random mat can be obtained by a spray-up method ("dry type" method) in which cut reinforcement fibers and a thermosetting resin are sprayed on a forming die simultaneously, or a method ("wet type" method) of adding a reinforcement fiber, which is previously cut, into a slurry containing a binder, and carrying out paper-making from the slurry.

It was known to increase fiber volume content (Vf) as means for improving mechanical physical property of a composite material, but it is difficult to increase the fiber volume content in a random mat using cut fibers for several reasons. For one, fibers are present along directions intersecting with the plane of the random mat at substantial angles and crossing of fibers is likely to occur. Also, the strength of a molded product from a random mat decreases by about half as compared with that from continuous fibers since fibers in the random mat are discontinuous.

In recent years, techniques for improving mechanical physical property of a composite material using a random mat involved using chopped fiber bundles in which the cross-sectional areas are changed by cutting fiber bundles at slants of angles (JP-A-2009-114611 and JP-A-2009-114612). Generally, in order to obtain good homogeneity, the stacking of tens of layers is needed. However, because each fiber bundle is relatively thick, a layer thickness of more than 2 to 3 mm is needed in order to obtain homogeneity, and thus it is difficult to obtain a product having a sufficiently small thickness.

Composites Part A, vol. 38 (2007), pp. 755-770 discloses a composite material of a random mat including carbon fibers and a thermosetting resin as a matrix.

As described above, a composite material in which a thermosetting resin is used as matrix was proposed. Usually, a fiber-reinforced composite material is obtained by heating and pressurizing a material called a prepreg, which is previously obtained by impregnating a fiber-reinforced base material with a thermosetting resin, for 2 hours or more using an autoclave. In recent years, there was proposed an RTM (Resin Transfer Molding) method in which a thermosetting resin is poured into a mold in which a fiber-reinforced base material not impregnated with a resin is set, and the molding time was shortened substantially. However, even when the RTM method is utilized, it may take 10 minutes or more to mold a single part.

Therefore, a composite using a thermoplastic resin as a matrix instead of a thermosetting resin is attracting attention. However, a thermoplastic resin generally has a higher viscosity than a thermosetting resin, and thus the time for impregnating a fiber base material with the resin is long and, as a result, the tact time up to molding becomes long.

As a technique of solving the above matters, a technique called a thermoplastic stamping molding (TP-SMC: Thermoplastic-Sheet Molding Compound) is proposed (for example, Japanese Patent No. 4161409). This is a molding method of: heating chopped fibers, which are previously impregnated with a thermoplastic resin, at a temperature of more than the melting point; supplying the chopped fibers to a part in a mold and immediately after that, closing the mold; making fibers and a resin flowing within the mold to produce a product configuration; and cooling and molding of the product. In this technique, molding can be completed in short time of about 1 minute by using the fibers previously impregnated with the resin. This technique uses a molding material which is called SMC or a stampable sheet. In this thermoplastic stamping molding, due to flowing fibers and a resin within a mold, a thin product cannot be produced and the orientations of the fibers are not aligned and are difficult to control.

For a composite material including a thermoplastic resin as a matrix, there is proposed a technique of an injection molding of filament pellets including a reinforcement fiber (JP-A-9-286036). However, even for a filament pellet, the length of the pellet is limited, and that the reinforcement fiber is cut in the thermoplastic resin by kneading and mixing, thus the length of the reinforcement fiber is unable to be maintained. Further, reinforcement fibers are oriented in a forming method such as an injection molding, and thus an isotropic product cannot be obtained.

SUMMARY

In one aspect, a fiber-reinforced composite material is provided that may be formed into a thin and homogenous product and is excellent in physical property and surface quality, and which was previously unattainable using thermoplastic resin based composite materials.

In one embodiment, a composite material includes: carbon fibers having an average fiber length of more than about 10 mm and about 100 mm or less; and a thermoplastic resin. The carbon fibers are substantially two-dimensionally-randomly oriented in the composite material. The composite material includes a carbon fiber bundle (A) in a ratio of more than 0 volume % and less than about 30 volume % to a total volume of the carbon fibers, and the carbon fiber bundle (A) includes the carbon fibers of a critical single fiber number defined by formula (1) or more. An average number (N) of the carbon fibers in the carbon fiber bundle (A) satisfies formula (2).

$$\text{Critical single fiber number} = 600/D \quad (1)$$

$$1.0 \times 10^4/D^2 < N < 2.5 \times 10^4/D^2 \quad (2)$$

In formulae (1) and (2), D is an average fiber diameter (μm) of the carbon fibers.

Figure 1:
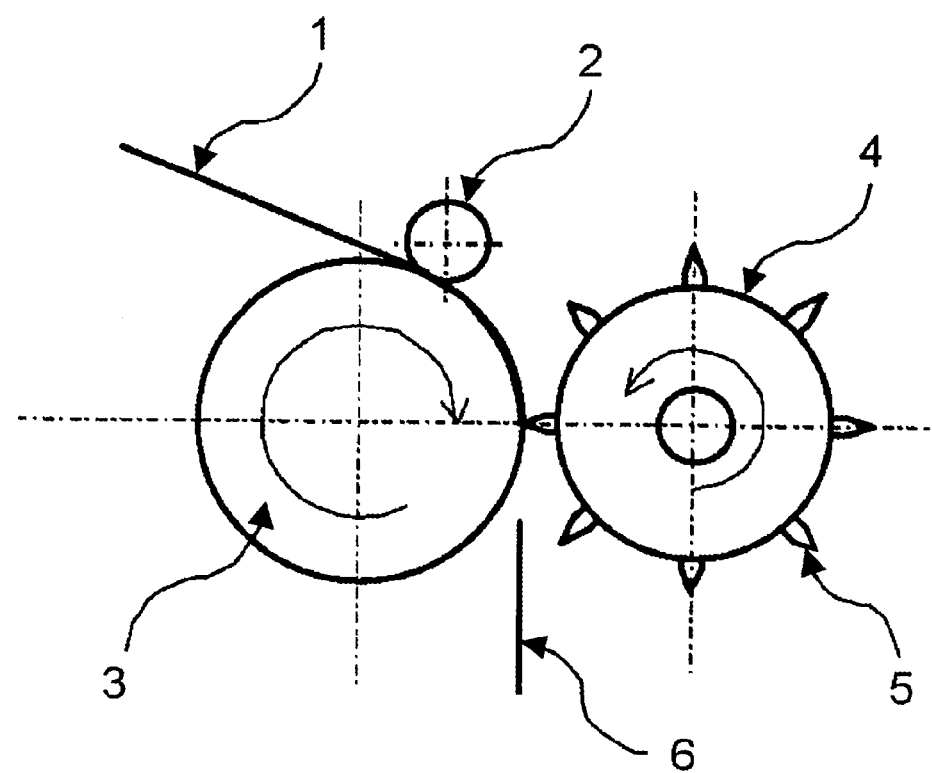
FIG. 1 is a schematic view of a cutting process of fibers.

The reference numerals in the drawings are set forth below.

1: Carbon fiber strand
2: Pinch roller
3: Rubber roller
4: Main body of rotary cutter
5: Edge
6: Cut carbon fiber
7: Angle between circumferential direction of rotary cutter and arrangement direction of edges

DETAILED DESCRIPTION

A composite material as described herein may develop high mechanical strength and further can become thinning and isotropic. Thus, the composite material can be used for various component members, for example, an inner plate, outer plate, and components members of automobiles, and frames and housings of various electric products and machines.

(Composite Material)

A composite material includes: carbon fibers having an average fiber length of more than about 10 mm and about 100 mm or less; and a thermoplastic resin. The carbon fibers are substantially two-dimensionally-randomly oriented in the composite material. The composite material includes a carbon fiber bundle (A) in a ratio of more than 0 volume % and less than about 30 volume % to a total volume of the carbon fibers, and the carbon fiber bundle (A) includes the carbon fibers of a critical single fiber number defined by formula (1) or more. An average number (N) of the carbon fibers in the carbon fiber bundle (A) satisfies formula (2).

$$\text{Critical single fiber number} = 600/D \qquad (1)$$

$$1.0 \times 10^4/D^2 < N < 2.5 \times 10^4/D^2 \qquad (2)$$

In formulae (1) and (2), D is an average fiber diameter (μm) of the carbon fibers.

The language "carbon fibers are substantially two-dimensionally-randomly oriented" means that carbon fibers in a composite material has a principle orientation direction of fiber axes thereof in a tangent surface of the composite material, and when the modulus of elasticity in tension is measured in each of two directions at right angles to each other in the tangent surface, the ratio of a larger modulus of elasticity in tension to a smaller one does not exceed 2.

(Carbon Fiber)

A carbon fiber which constitutes a composite material may be discontinuous, and the carbon fiber has an average fiber length of more than about 10 mm and about 100 mm or less. A composite material may include to some extent long carbon fiber, and is excellent in surface quality. From the viewpoint of being excellent in surface quality, the upper limit of the average fiber length usually should not exceed about 50 mm and more often does not exceed about 40 mm. Also, from the viewpoint of being excellent in strength, the lower limit of the average fiber length should be about 15 mm.

In some aspects, the distribution of fiber lengths of carbon fibers in a composite material is sharp. By use of a manufacturing method as described later, carbon fibers having a uniform fiber length can be included in a composite material, thus providing a composite material having homogeneous physical property.

An average fiber diameter of carbon fibers which constitute a composite material is usually about 3 to 12 μm, more often about 5 to 8 μm, and more usually 5 to 7 μm.

As for a carbon fiber, one to which a sizing agent is attached is often used, and an amount of the sizing agent is usually 0 to about 10 parts by weight to 100 parts by weight of the carbon fibers.

(Degree of Opening)

Generally, carbon fibers form a fiber bundle in which several thousands to several tens of thousands of filaments (fibers) are gathered. When a thin composite is to be obtained especially, if carbon fibers are used with fiber bundles as they are, the crossing portion of the fiber bundles becomes thick locally and the thin composite cannot be obtained. Therefore, it is important to open a fiber bundle of carbon fibers and to use the opened carbon fibers. In a composite material as described herein, the degree of opening of a fiber bundle of carbon fibers is controlled, and a carbon bundle of a specific number or more carbon fibers and other opened carbon fibers may be included in a specific ratio.

A composite material as described herein includes a carbon fiber bundle (A) in a ratio of more than 0 volume % and less than about 30 volume % to a total volume of the carbon fibers. The carbon fiber bundle (A) includes the carbon fibers of a critical single fiber number defined by formula (1) or more.

$$\text{Critical single fiber number} = 600/D \qquad (1)$$

(D is an average fiber diameter (μm) of the carbon fibers.)

As carbon fibers other than the carbon fiber bundle (A), a single fiber or a fiber bundle having the carbon fibers of the critical single fiber number or less may be present in the composite material.

A composite material may have a specific ratio of carbon fibers which are present as a fiber bundle. If the ratio of the carbon fiber bundle (A) exceeds about 30 volume %, it may become difficult to obtain a fiber-reinforced composite material which is excellent in surface property. In some examples, the ratio of the carbon fiber bundle (A) is more than 0 volume % and less than about 20 volume %.

An average number (N) of the carbon fibers in the carbon fiber bundle (A) constituted by the carbon fibers of the critical single fiber number or more satisfies formula (2).

$$1.0 \times 10^4/D^2 < N < 2.5 \times 10^4/D^2 \qquad (2)$$

(D is an average fiber diameter (μm) of the carbon fibers.)

When the average number (N) of the carbon fibers in the carbon fiber bundle (A) is less than $1.0 \times 10^4/D^2$, it may become difficult to obtain a thin shaped product. When the average number (N) of the carbon fibers in the carbon fiber bundle (A) exceeds $2.5 \times 10^4/D^2$, it may become difficult to obtain a fiber-reinforced composite material which is excellent in surface quality.

As seen above, by specifying: the ratio of the carbon fiber bundle (A) including the carbon fibers of the critical single fiber number defined by formula (1) or more; and the average number (N) of the carbon fibers in the carbon fiber bundle (A), it is possible to provide a composite material in which the filing efficiency of fibers is good, there is little variation in density of fibers, and the mechanical strength is excellent.

Further, by making the carbon fiber bundle including the specific number or more carbon fibers and other opened carbon fibers coexistent in the specific ratio, it is possible to obtain a composite material which is comparatively excellent in mechanical strength and excellent in surface quality.

In some examples, the average fiber diameter of the carbon fibers which constitute a composite material is about 5 to 8 μm, the critical single fiber number is about 86 to 120, and the ratio of the carbon fiber bundle of the critical single fiber number or more carbon fibers to the total volume of the carbon fibers is more than 0 volume % and less than about 30 volume %.

When the average fiber diameter of carbon fibers is 5 μm, the average number of carbon fibers in a fiber bundle often ranges inform about 400 to 1,000, more usually from about 400 to 800. When the average fiber diameter of carbon fibers is 8 μm, the average number of carbon fibers in a fiber bundle often ranges from about 204 to 510, more usually from about 204 to 400.

A composite material as described herein can have various kinds of thickness, and can provide a thin shaped product, for example having a thickness of about 0.2 to 1 mm. Namely, it is possible to provide a composite material which conforms to thicknesses for various purposes, and is especially useful to form a thin shaped product which can be used as a skin layer of a sandwich material.

(Thermoplastic Resin)

An amount of a thermoplastic resin in a composite material often ranges from about 50 to 1,000 parts by weight to 100 parts by weight of carbon fibers. Often the amount of thermoplastic resin ranges from about 100 to 600 parts by weight to 100 parts by weight of carbon fibers, and more usually from about 150 to 300 parts by weight to 100 parts by weight of carbon fibers.

Examples of the thermoplastic resin include vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS plastics), acrylic resin, methacrylic resin, polyethylene resin, polypropylene resin, polyamide 6 resin, polyamide 11 resin, polyamide 12 resin, polyamide 46 resin, polyamide 66 resin, polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, and polyether ether ketone resin. Otherwise, two or more thermoplastic resin can be used in combination.

(Other Additives)

Other additives may include fibrous filler such as glass fiber and organic fiber, non-fibrous filler, flame retardant, anti-UV agent, pigment, mold lubricant, softener, plasticizer, and surfactant. The types and amounts of additives should be selected so as not to impair the desired properties of the composite material.

(Manufacturing Method)

A suitable method for obtaining a composite material is described below. A composite material may be manufactured by the following steps 1 to 5.

1. Step of cutting carbon fibers;
2. Step of opening a carbon fiber bundle into carbon fibers discretely by introducing cut carbon fibers (which include the carbon fiber bundle not opened) in a tube and blowing air onto the cut carbon fibers;
3. Step of, while diffusing the opened carbon fibers, sucking the carbon fibers together with a thermoplastic resin in fibrous or powder from, and spraying the carbon fibers and the thermoplastic resin simultaneously;
4. Step of fixing the carbon fibers and the thermoplastic resin sprayed to produce a random mat (random oriented fiber mat); and
5. Step of press forming the random mat.

Hereafter, each step is described in detail.

(Cutting Step)

Figure 2:
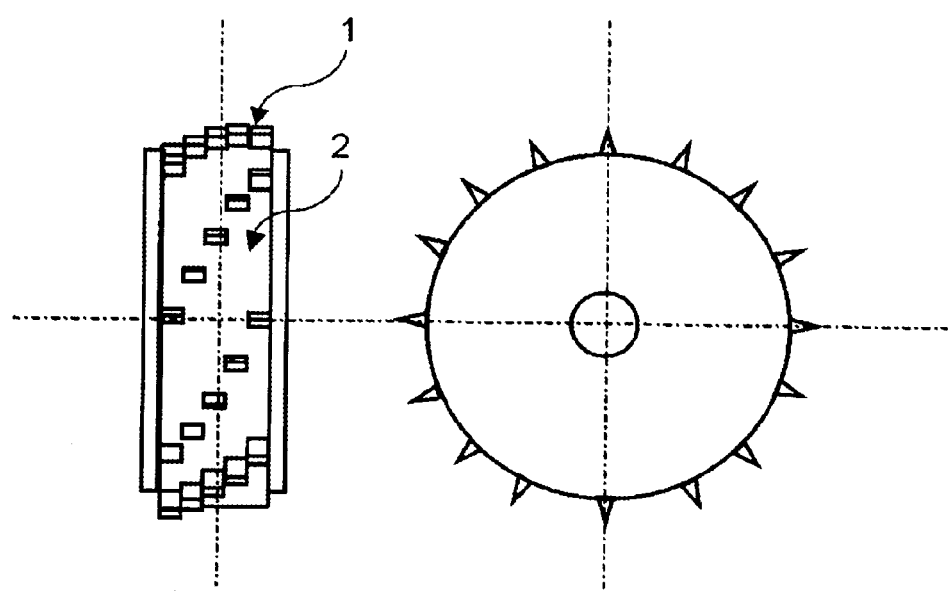
FIG. 2A is a front view of a rotary fiber separating cutter.
FIG. 2B is a cross-section view of the rotary fiber separating cutter.
Figure 3:
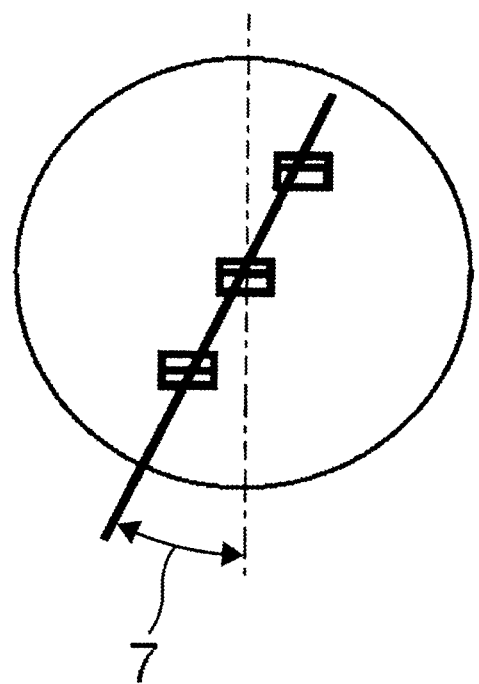
FIG. 3 is an explanatory view of a knife angle.

A step of cutting a carbon fiber is described. The carbon fiber may be cut with a knife such as a rotary cutter. An embodiment of the cutting step using a rotary cutter is shown in FIG. 1. In some examples, the rotary knife is a spiral knife or fiber separating knife with a specified arrangement of edges. An example of a rotary fiber separating cutter is shown in FIGS. 2 and 3 FIG. 2A is a front view of the cutter and FIG. 2B is a cross-section view of the cutter, and FIG. 3 is an explanatory view of a knife angle of the cutter. The rotary fiber separating cutter is configured to arrange a plurality of edges at equal intervals and spirally along the main part of the cutter. In obtaining a composite material excellent in surface quality, unevenness in fiber density greatly affects the surface quality. Some types of rotary cutters result in the fiber being discontinuously cut. When such cut fibers are introduced into a spray step as they are, the amount of sprayed fibers (fiber density) tends to become uneven. On the other hand, by continuously cutting a carbon fiber using a knife with a specified arrangement of edges, it is possible to spray the cut fibers with less unevenness in amount of fiber density. The knife angle of a rotary cutter used for continuously cutting a carbon fiber may be geometrically calculated based on the width of the carbon fiber strand and the fiber length of the cut fiber, such as represented by the following formula (3):

$$\text{Fiber Length of Carbon Fiber(Pitch of Edges)}=(\text{Width of Carbon Fiber Strand})\times\tan(90-\theta) \quad (3)$$

Here, $\theta$ is an angle between the circumferential direction of the rotary cutter and the direction in which edges of the cutter are arranged.

(Step of Fiber Opening)

Subsequently, the cut carbon fibers which include a fiber bundle not opened are introduced in a tube and the fiber bundle is opened into carbon fibers discretely by blowing air onto the cut carbon fibers. Concretely, this step is a process of continuously introducing the cut carbon fibers in a tube and blowing pressure air onto the cut carbon fibers directly to open a fiber bundle into carbon fibers discretely. The degree of opening can be properly controlled by the pressure of the blowing air.

Generally, carbon fibers are forming a fiber bundle in which several thousands to several tens of thousands of filaments (fibers) are gathered. When a thin composite is desired and carbon fibers are used with fiber bundles as they are, the crossing portion of the fiber bundles becomes thick locally and the thin composite is difficult to obtain. Therefore, it is important to open a fiber bundle of carbon fibers and to use the opened carbon fibers. One suitable method of opening a fiber bundle of carbon fibers is blowing compressed air onto the carbon fibers directly. In this method, by blowing air at a wind speed of about 500 to 1,000 msec through a compressed air blowing hole, it is possible to open a fiber bundle of carbon fibers nearly completely. A fiber bundle can be easily opened by blowing compressed air onto the fiber bundle directly, at a pressure of about 0.2 to 0.8 MPa applied from outside, through several holes having a diameter $\Phi$ of about 1 mm on the tube through which carbon fibers passes.

(Step of Spraying)

Subsequently, a spraying step is performed. In this step, the opened carbon fibers are diffused and at the same time they are sucked together with a thermoplastic resin in fibrous or powder form, and the carbon fibers and the thermoplastic resin are sprayed simultaneously. In the spraying step, the amount of thermoplastic resin supplied is usually about 50 to 1,000 parts by weight to 100 parts by weight of carbon fibers. More often, it is about 100 to 600 parts by weight to 100 parts by weight of carbon fibers, and most usually, from about 150 to 300 parts by weight to 100 parts by weight of carbon fibers.

Here, it is expeditious to spray carbon fibers and a thermoplastic resin in a fibrous or powder form so that the carbon fibers are oriented two-dimensionally. In order to spray opened fibers to be oriented two-dimensionally, the spray method and the fixing method as described below may be used. For spraying carbon fibers, for example, a taper tube in a cone form may be used. Within the tube in a cone form, air diffuses and the flow speed of the air in the tube decreases, and then a rotational force is applied to carbon fibers. By utilizing this Venturi effect, opened carbon fibers can be readily diffused and sprayed.

In some examples, carbon fibers are sprayed on a breathable sheet provided in the lower part of a fiber opening apparatus. Also, it is advantageous to spray carbon fibers on a movable breathable sheet having a suction mechanism for the following fixing step.

(Step of Fixing)

Subsequently, the sprayed carbon fibers and thermoplastic resin are fixed to obtain a random mat. Concretely, the sprayed carbon fibers and thermoplastic resin are sucked by air from the lower side of a breathable sheet to fix the carbon fibers, and thus a random mat is obtained. The thermoplastic resin which was sprayed together with the carbon fibers are mixed with the carbon fibers and if the thermoplastic resin is in a fibrous form, it is fixed by air suction. If the thermoplastic resin is in a powder form, it is fixed along with the carbon fibers.

Specifically, air suction is preformed from the lower side of a breathable sheet to obtain a random mat of high two-dimensional orientation. It is possible to suck a thermoplastic resin in a powder or short fibrous form by negative pressure occurred and further to easily mix the thermoplastic with carbon fibers. In the obtained random mat, a thermoplastic resin is present near carbon fibers, and thus it is possible to impregnate the carbon fibers with the thermoplastic resin for a comparatively short time in the following press step since the moving distance of the thermoplastic resin is short. Further, it is also possible to previously set, in a fixing part, a breathable non-woven cloth which has the same material as a matrix resin to be used and to spray carbon fibers and powder of the resin on the non-woven cloth.

(Press)

Subsequently, the obtained random mat may be subjected to press forming to produce a composite material. At this time, two or more random mats can be stacked to obtain a composite material having a desired thickness. The method and conditions of press forming are not limited. In some examples, hot press conditions include a temperature ranging from the melting point of the thermoplastic resin which is a matrix to the temperature of the melting point+80° C. or the temperature of decomposition of the thermoplastic resin. The press pressure and press time can be appropriately selected.

(Shaped Product)

A composite material can be formed into a thin plate-like product having a desired thickness, by press forming as described above. Also, a shaped product having a desired shape such as a three-dimensional shape can be formed by selecting the form of a mold. In some examples, the moving distance of a resin is short and impregnation of the resin can be performed for a comparatively short time, in a hot press step. Since a product having a thin thickness can be obtained, it can be advantageously used as a skin layer of a sandwich material. Further, carbon fibers isotropically exist in the shaped product, so homogeneity is secured.

A shaped product may be a layered structure. Examples of suitable methods of manufacturing such a layered structure include a method of: for example in a fixing step, arranging a sheet such as a random mat using glass fiber or organic fiber, or non-woven cloth, which has air permeability, on a breathable sheet; and applying carbon fibers on the sheet.

Since a thin shaped product is obtained, it can be used as a skin layer of a sandwich material. The core material of the sandwich material is not limited, but by way of example it can be a foam of a resin or non-woven cloth of glass fiber or organic fiber. The shaped product from a composite material may be stacked with a core material and, for example, the stacked one can be press-formed to produce a sandwich material. For a layered structure with non-woven cloth of glass fiber or organic fiber as described above, the non-woven layer can be used as a core material of a sandwich material.

EXAMPLES

Examples are described below, but the present invention is no limited thereto.

(How to measure the ratio of carbon fiber bundle (A) to a total quantity of carbon fibers in a composite material)

1) A composite material is cut to a sample having a size of 100 mm×100 mm. After the thickness (Ta) of the sample is measured, the sample is heated in a furnace at 500° C. for about 1 hour to remove resin.

2) All fiber bundles are taken with tweezers from the sample from which resin is removed.

3) For all the fiber bundles, the length (Li) and weight (Wi) of each of the fiber bundles and the number (I) of the fiber bundles are measured and recorded. With respect to fiber bundles which are too small to be taken with tweezers from the sample, the total weight (Wk) of the fiber bundles are collectively measured at the end. For the measurement, a balance which is measurable to $1/1{,}000$ g is used. When the fiber length of a fiber bundle is short, the weight of the fiber bundle is small and is difficult to be measured. In such a case, fiber bundles are classified in terms of fiber bundle width at an interval of about 0.2 mm, a plurality of fiber bundles classified in the same group are gathered, and the weight of the gathered fiber bundles are measured and its average weight value may be used.

The critical single fiber number is calculated based on the average fiber diameter (D) of the carbon fiber used in the composite material, and all the fiber bundles are separated into a group of fiber bundles (carbon fiber bundle (A)) having carbon fibers of the critical single fiber number or more; and a group of fiber bundles having carbon fibers of less than the critical single fiber number. For each group, the above measurement and evaluation is performed.

4) After the measurement for all the fiber bundles, the following calculations are performed. Using the tex (F) of used carbon fibers, the number (Ni) of fibers in each of the fiber bundles can be calculated by the following formula.

$$Ni=Wi/(Li \times F)$$

The average number (N) of fibers in a carbon fiber bundle (A) can be calculated by the following formula.

$$N=\Sigma Ni/I_A$$

Here, $I_A$ represents the number of carbon fiber bundles (A) in the sample.

The ratio (VR) of the carbon fiber bundles (A) to the total volume of carbon fibers in the sample can be calculated by the following formula, using the density ($\rho$) of carbon fibers used.

$$VR=\Sigma(Wi/\rho) \times 100/((Wk+\Sigma Wi)/\rho)$$

For reference, the fiber volume content (Vf) of the sample can be calculated by the following formula.

$$Vf=(Wk+\Sigma Wi)/\rho \times 100/Va$$

Here, Va is the volume of the sample, Va=100×100×Ta.

Example 1

"TENAX" (registered trademark) STS40-24KS (Average fiber diameter: 7 μm, Fiber width: 10 mm) manufactured by TOHO TENAX Co., Ltd. was used as a carbon fiber. As a cutting apparatus, a rotary cuter in which spiral edges are arranged on the surface using cemented carbide was used. In this regard, θ in the following formula (3) was 45 degrees and the fiber length of carbon fibers (pitch of edges) was set to 10 mm.

Fiber Length of Carbon Fiber(Pitch of Edges)=(Width of Carbon Fiber Strand)×tan(90−θ)　　(3)

Here, θ is an angle between the circumferential direction of the rotary cutter and the direction in which edges of the cutter are arranged.

As a fiber opening apparatus, a tube having small holes were prepared and compressed air was supplied via the small holes using a compressor. The wind speed through the small holes was 550 msec. This tube was placed just below the rotary cutter and the lower part of the tube had a taper tube welded. A matrix resin was supplied from the lateral side of the taper tube. A pellet of polycarbonate, "Panlite" (registered trademark) L-1225L manufactured by TEIJIN CHEMICALS LTD. was cold-pulverized and classified by mesh 20 and mesh 30 into powder, and the powder was used as the matrix resin. The average particle diameter of the powder was about 1 mm. Next, a table movable in X-Y directions was placed below the exit port of the taper tube and suction was made by blower from the lower side of the table. The supplying amount rate of the carbon fibers and the supplying amount rate of the matrix resin were set to 300 g/min and 600 g/min, respectively, and the opening apparatus was operated to obtain a random mat having a thickness of about 2 mm, in which the carbon fibers having the average fiber length of 10 mm and the thermoplastic resin were mixed. The density of the carbon fibers in the obtained random mat was 300 g/m².

This random mat was heated for 5 minutes at 2.0 MPa with a pressing device heated at 300° C. to obtain a shaped plate having a thickness t=0.7 mm. With respect to the obtained composite material (shaped plate), the fiber volume content (Vf) was 24%, and there was no irregularity on the surface due to fibers and the quality was good.

Further, with respect to the obtained composite material (shaped plate), the ratio of the carbon fiber bundle (A) and the average number (N) of carbon fibers in the carbon fiber bundle (A) were observed. The critical single fiber number defined by formula (1) was 86, the ratio of the carbon fiber bundle (A) to the total amount of carbon fibers in the mat was 14%, and the average number (N) of carbon fibers in the carbon fiber bundle (A) was 370.

Sample pieces of 250×25 mm were cut out every n=5 from each of 0 and 90 degree directions in the shaped plate and the tensile strength of the shaped plate was measured according to JIS K7164. The measurement result was 220 MPa.

Example 2

"TENAX" (registered trademark) IMS60-12K (Average fiber diameter: 5 μm, Fiber width: 6 mm) manufactured by TOHO TENAX Co., Ltd. was used as a carbon fiber. As a cutting apparatus, a rotary cuter in which spiral edges are arranged on the surface using cemented carbide was used. In this regard, θ in the above formula (3) was 17 degrees and the fiber length of carbon fibers (pitch of edges) was set to 20 mm. An apparatus similar to one in Example 1 was used as a fiber opening apparatus. By increasing the pressure in the compressor, the wind speed through the small holes was set to 750 msec. The tube was placed just below the rotary cutter and the lower part of the tube had a taper tube welded. A matrix resin was supplied from the lateral side of the taper tube. PA66 fiber (T5 nylon manufactured by ASAHI KASEI FIBERS CORPORATION, Tex: 1,400 dtex) which was dry-cut by 2 mm was used as the matrix resin. Next, a table movable in X-Y directions was placed below the exit port of the taper tube and suction was made by blower from the lower side of the table. The supplying amount rate of the carbon fibers and the supplying amount rate of the matrix resin were set to 2,000 g/min and 6,000 g/min, respectively, and the opening apparatus was operated to obtain a random mat having a thickness of about 20 mm, in which the carbon fibers having the average fiber length of 20 mm and the thermoplastic resin were mixed. The density of the carbon fibers in the obtained random mat was 2,000 g/m².

This random mat was heated for 3 minutes at 2.5 MPa with a pressing device heated at 280° C. to obtain a shaped plate having a thickness t=0.6 mm. With respect to the obtained composite material (shaped plate), the fiber volume content (Vf) was 19%, and there was no irregularity on the surface due to fibers and the quality was good.

Further, with respect to the obtained composite material (shaped plate), the ratio of the carbon fiber bundle (A) and the average number (N) of carbon fibers in the carbon fiber bundle (A) were observed. The critical single fiber number defined by formula (1) was 120, the ratio of the carbon fiber bundle (A) to the total amount of carbon fibers in the mat was 3%, and the average number (N) of carbon fibers in the carbon fiber bundle (A) was 550.

Sample pieces of 250×25 mm were cut out every n=5 from each of 0 and 90 degree directions in the shaped plate and the tensile strength of the shaped plate was measured. The measurement result was 210 MPa.

Comparative Example 1

A random mat was produced in a similar manner to Example 1 except that the pressure in the compressor was reduced.

With respect to the obtained random mat, the ratio of the carbon fiber bundle (A) and the average number (N) of carbon fibers in the carbon fiber bundle (A) were observed. The critical single fiber number defined by formula (1) was 86, the ratio of the carbon fiber bundle (A) to the total amount of carbon fibers in the mat was 35%, and the average number (N) of carbon fibers in the carbon fiber bundle (A) was 820.

Carbon fiber bundles in the obtained random mat were thick. Using this random mat, a shaped plate was produced in a similar manner to Example 1. There were raised portions on the surface of the obtained shaped plate, which corresponding to portions including the fiber bundles, and a flat and smooth surface of the shaped plate was not obtained.

What is claimed is:

1. A composite material comprising: carbon fibers having an average fiber length of more than about 10 mm and about 100 mm or less; and a thermoplastic resin,
    wherein the carbon fibers are substantially two-dimensionally-randomly oriented in the composite material,
    wherein the composite material comprises a carbon fiber bundle (A) in a ratio of more than 0 volume % and less than about 30 volume % to a total volume of the carbon fibers, the carbon fiber bundle (A) including the carbon fibers of a critical single fiber number defined by formula (1) or more, and
    wherein an average number (N) of the carbon fibers in the carbon fiber bundle (A) satisfies formula (2), $$\text{Critical single fiber number} = 600/D \tag{1}$$

$$1.0 \times 10^4/D^2 < N < 2.5 \times 10^4/D^2 \tag{2}$$

wherein D is an average fiber diameter (μm) of the carbon fibers.

2. The composite material according to claim 1, which includes the thermoplastic resin in an amount of about 50 to 1,000 parts by weight to 100 parts by weight of the carbon fibers.

3. The composite material according to claim 2, wherein the amount of the thermoplastic resin in the composite material is about 100 to 600 parts by weight to 100 parts by weight of the carbon fibers.

4. The composite material of claim 1, wherein the average fiber length is from about 15 mm to 50 mm.

5. The composite material of claim 4, wherein the average fiber length is from about 15 mm to 40 mm.

6. The composite material of claim 5, wherein the average fiber length is from about 20 mm to 40 mm.

7. The composite material of claim 1, wherein an average fiber diameter of carbon fibers which constitute a composite material is about 3 to 12 µm.

8. The composite material of claim 7, wherein the average fiber diameter is from about 5 to 8 µm.

9. An article comprising the composite material of claim 1.

10. The article of claim 9, which is selected from the group consisting of an inner plate, an outer plate, a component member of an automobile, and frames or housings of electrical products or machines.

* * * * *